(12) United States Patent
Nozawa

(10) Patent No.: US 10,701,230 B2
(45) Date of Patent: Jun. 30, 2020

(54) IMAGE FORMATION APPARATUS

(71) Applicant: Konica Minolta, Inc., Tokyo (JP)

(72) Inventor: Shigeki Nozawa, Gifu (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/173,496

(22) Filed: Oct. 29, 2018

(65) Prior Publication Data

US 2019/0141208 A1 May 9, 2019

(30) Foreign Application Priority Data

Nov. 8, 2017 (JP) ................. 2017-215713

(51) Int. Cl.
*H04N 1/00* (2006.01)
*G03G 15/20* (2006.01)
*G03G 21/16* (2006.01)

(52) U.S. Cl.
CPC ......... *H04N 1/00896* (2013.01); *G03G 15/20* (2013.01); *G03G 21/1652* (2013.01); *H04N 1/00005* (2013.01); *H04N 1/00352* (2013.01)

(58) Field of Classification Search
CPC .......... H04N 1/00896; H04N 1/00005; H04N 1/00352; G03G 15/20
USPC ........................................ 358/1.15
See application file for complete search history.

(56) References Cited

U.S. PATENT DOCUMENTS

| | | | |
|---|---|---|---|
| 8,683,105 B1* | 3/2014 | Shultz | G06F 3/1423 709/230 |
| 2013/0088732 A1* | 4/2013 | Matsuda | G06K 15/1849 358/1.9 |
| 2014/0043634 A1* | 2/2014 | Haga | H04N 1/00904 358/1.13 |

FOREIGN PATENT DOCUMENTS

| | | |
|---|---|---|
| JP | 2016-063407 A | 4/2016 |
| JP | 2016-177423 A | 10/2016 |

* cited by examiner

*Primary Examiner* — Saeid Ebrahimi Dehkordy
(74) *Attorney, Agent, or Firm* — Lucas & Mercanti, LLP

(57) ABSTRACT

The image formation apparatus includes: a multi-core processor having a plurality of cores; and an image forming mechanism configured to form an image on a recording medium. At least one of the plurality of cores includes a switching controller configured to switch a first OS run by the core for performing a mechanism controller processing to control the image forming mechanism and a second OS run by the core for performing a controller processing.

26 Claims, 13 Drawing Sheets

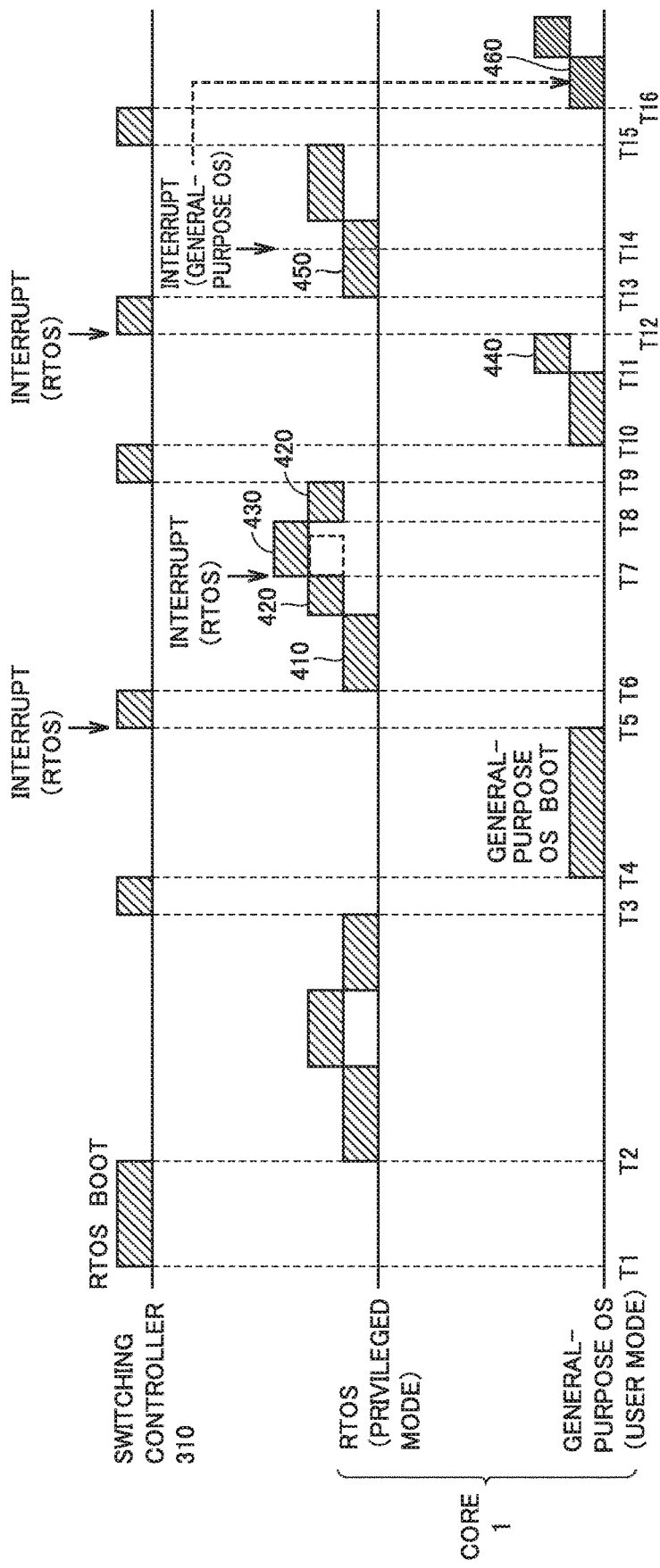

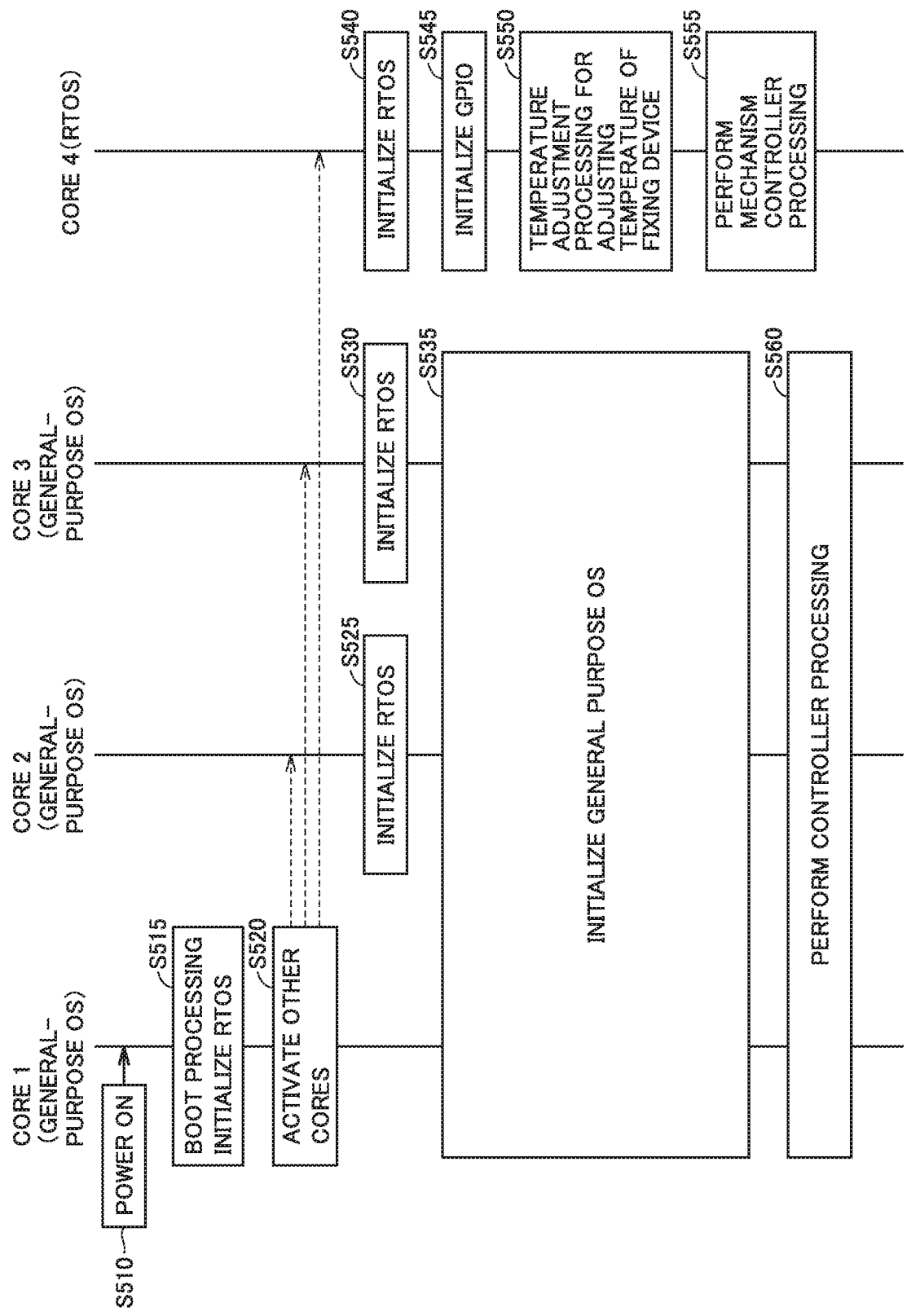

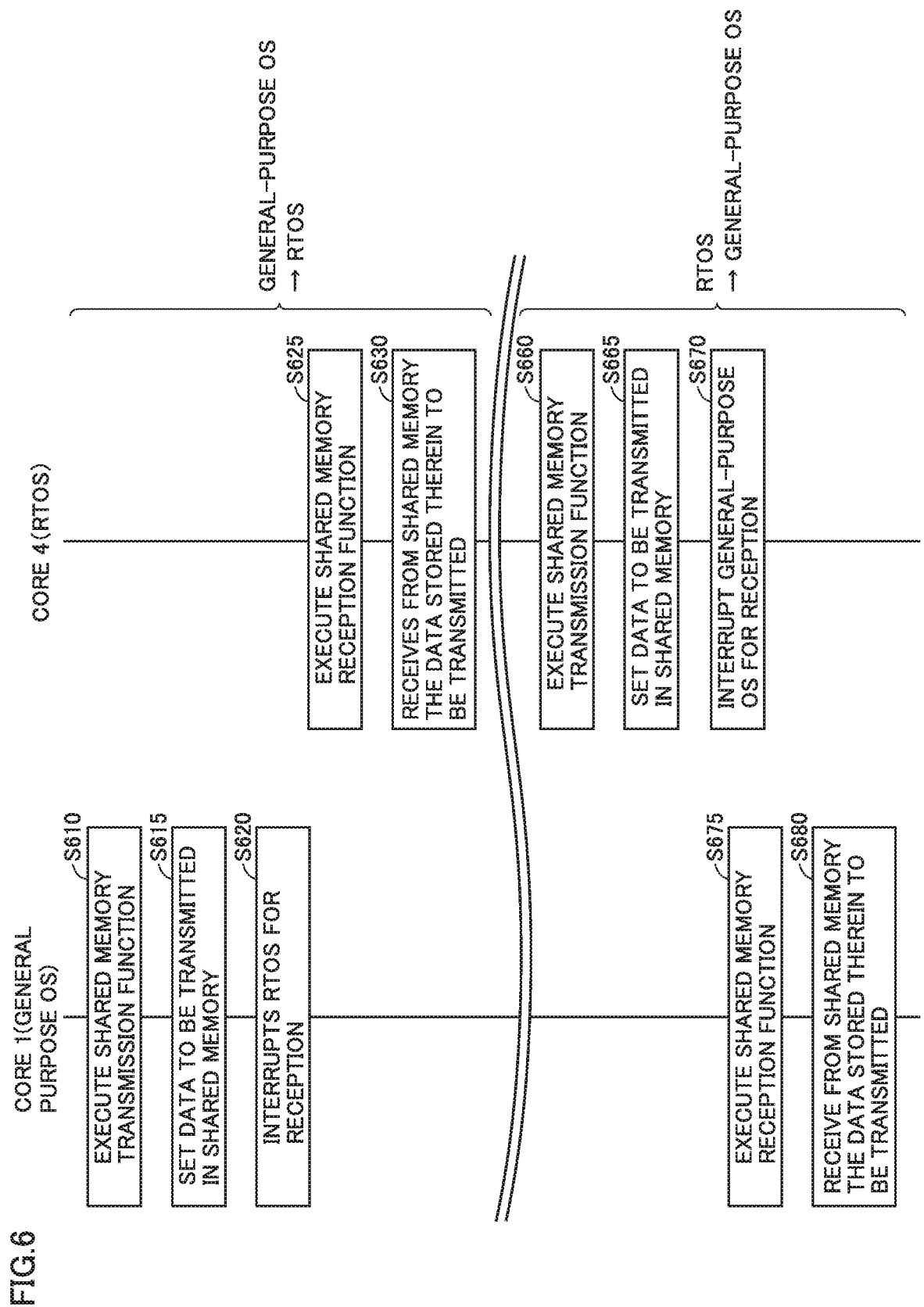

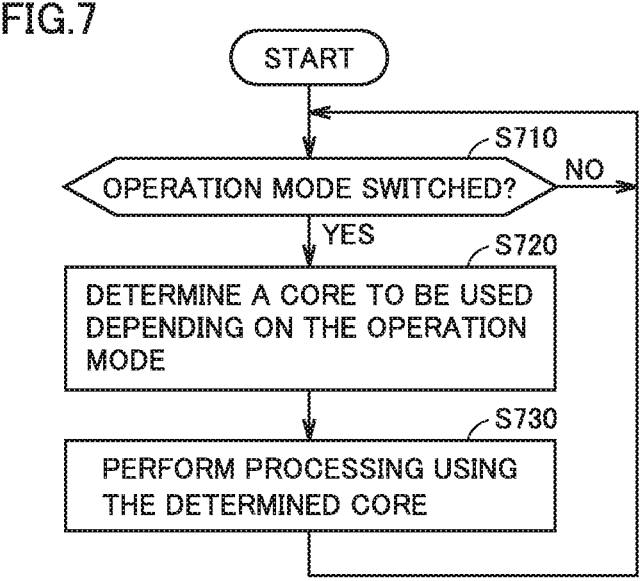

FIG.8

| MODE | CORE 1 | CORE 2 | CORE 3 | CORE 4 |
|---|---|---|---|---|
| PRINT | GENERAL-PURPOSE OS | GENERAL-PURPOSE OS | GENERAL-PURPOSE OS | – |
| SCAN/FAX | GENERAL-PURPOSE OS | GENERAL-PURPOSE OS | OFF | – |
| IMAGE STABILIZATION | GENERAL-PURPOSE OS | – | – | OFF |
| STANDBY | GENERAL-PURPOSE OS | OFF | OFF | OFF |
| SLEEP | GENERAL-PURPOSE OS | OFF | OFF | OFF |

| MODE | CORE 1 | CORE 2 | CORE 3 | CORE 4 |
|---|---|---|---|---|
| PRINT | – | – | – | RTOS |
| SCAN/FAX | – | – | OFF | RTOS |
| IMAGE STABILIZATION | – | RTOS | RTOS | OFF |
| STANDBY | RTOS | OFF | OFF | OFF |
| SLEEP | – | OFF | OFF | OFF |

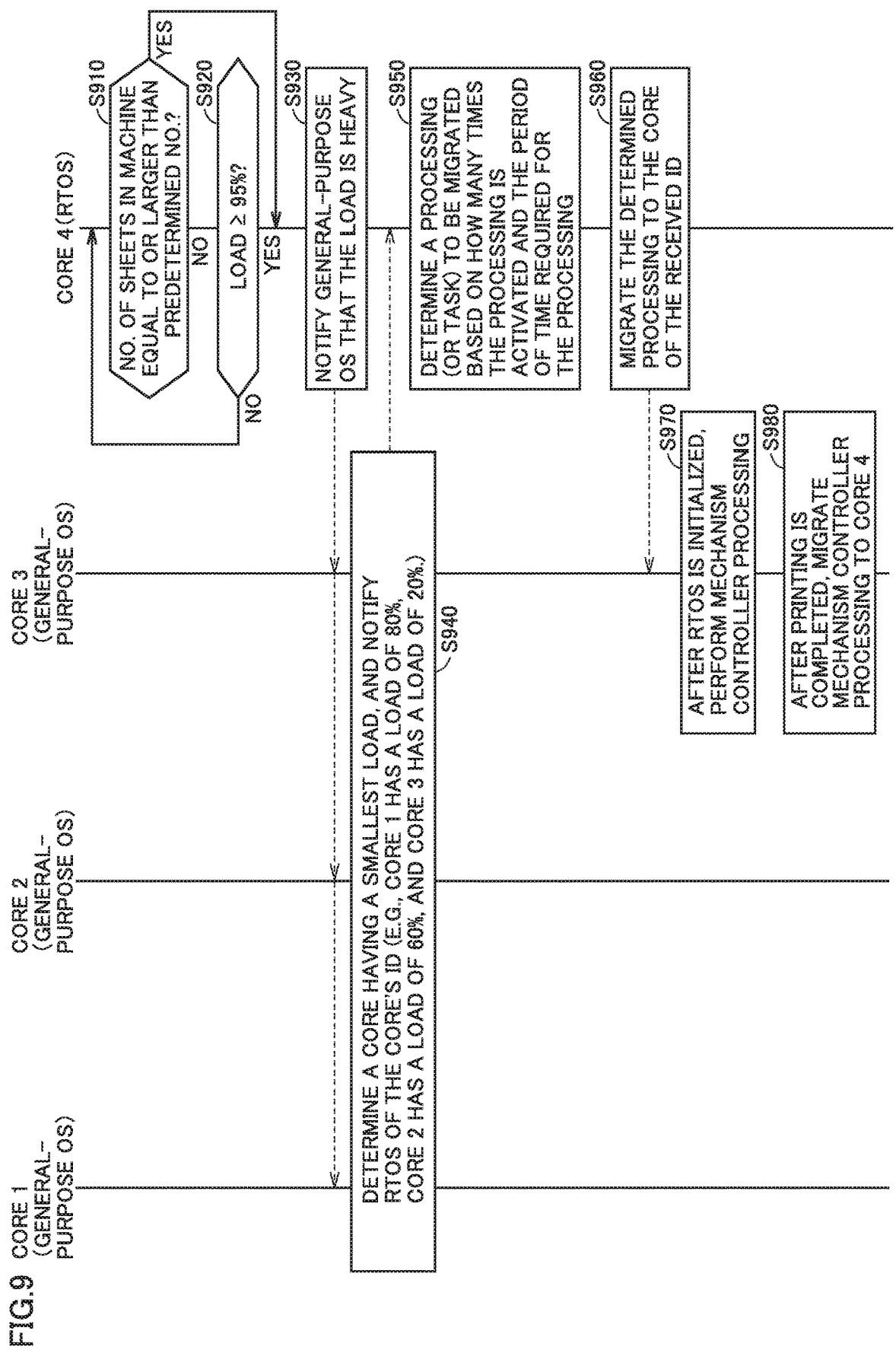

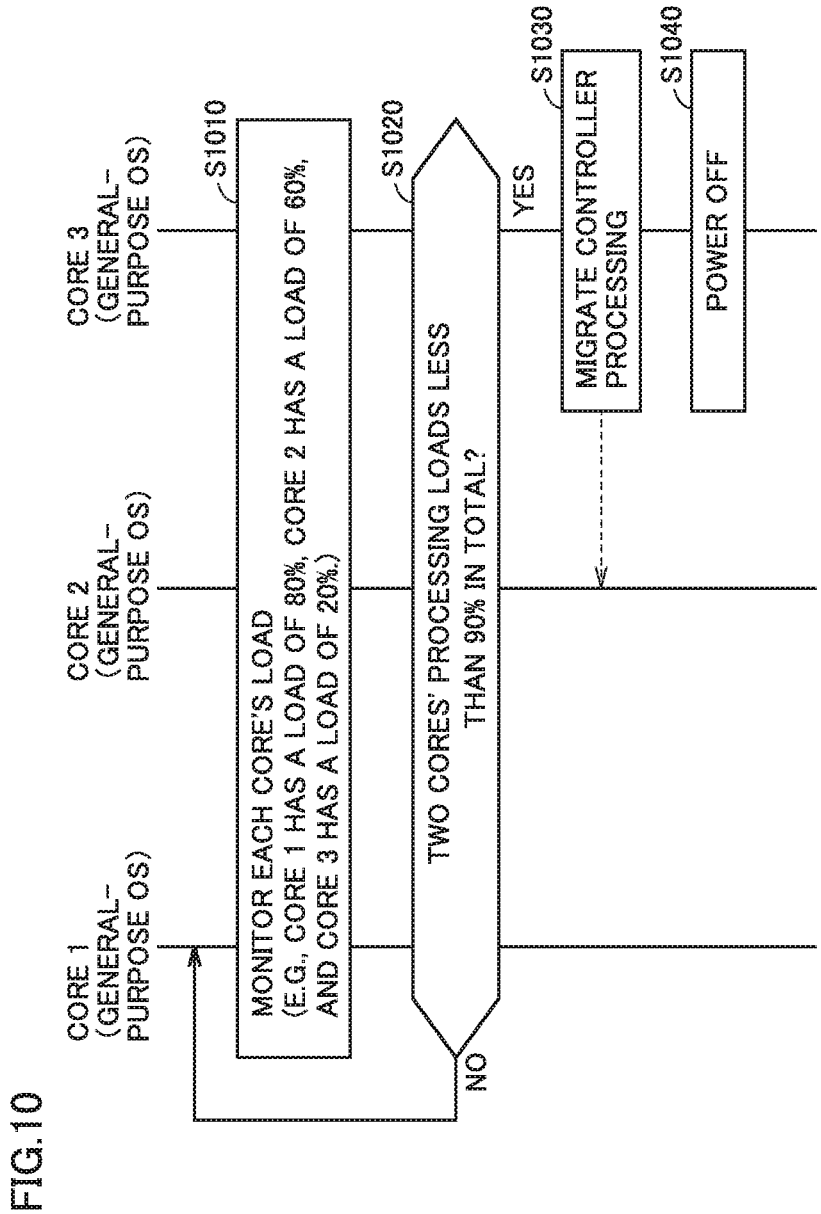

IMAGE FORMATION APPARATUS

The entire disclosure of Japanese Patent Application No. 2017-215713, filed on Nov. 8, 2017 is incorporated herein by reference in its entirety.

BACKGROUND

Technological Field

The present disclosure relates to an image formation apparatus, and more particularly, to an image formation apparatus comprising a multi-core processor.

Description of the Related Art

A typical image formation apparatus uses a processor to perform a mechanism controller processing for mainly controlling a physical mechanism (for example, a motor) and uses another processor to perform a controller processing for mainly processing data (for example, image processing) handled by the image formation apparatus.

The mechanism controller processing needs to be performed as timed as prescribed. Therefore, most of processors that perform the mechanism controller processing perform the mechanism controller processing on a real time operating system (OS) (hereinafter also referred to as "RTOS"). On the other hand, the controller processing needs to be processed at high speed in accordance with improvement in productivity of the image formation apparatus or the like. Therefore, image formation apparatuses in recent years tend to perform the controller processing on a general purpose OS (for example, Linux®) using a multi-core processor having a plurality of cores with high processing performance.

The multi-core processor essentially has a capability of performing both the mechanism controller processing and the controller processing. If both processings can be performed by a single multi-core processor, the image formation apparatus can be produced with a reduced cost. However, when a single multi-core processor performs these processings, a real-time performance required for the mechanism controller processing cannot be satisfied.

Regarding improvement of the real-time performance, for example, Japanese Laid-Open Patent Publication No. 2016-063407 discloses an image formation apparatus comprising a processor including a CPU composed of a plurality of cores, the plurality of cores having at least one predetermined core operated in a first control method involving relatively frequent process switching through task switching, and one or more cores other than the at least one predetermined core operated in a second control method involving relatively less frequent process switching through task switching (see the Abstract).

Japanese Laid-Open Patent Publication No. 2016-177423 discloses for the purpose of suppressing power consumption in a multi-core processor a controller which estimates a state of a target to be controlled after a predetermined time from information representing a status of the target to be controlled, determines necessity of a CPU core to endure a processing load caused with a change of a state of the target to be controlled in the controller to be switched, and instructs the target controller to switch activating/stopping of the CPU core (see the Abstract).

SUMMARY

Japanese Laid-Open Patent Publication No. 2016-063407 discloses a technique to perform control where a prescribed core is required to present real-time performance on a general-purpose OS, and perform control where a core other than the prescribed core is not required to present real time performance on the general-purpose OS. However, the general-purpose OS requires time to switch processings (or tasks). Therefore, the technique disclosed in Japanese Laid-Open Patent Publication No. 2016-063407 may not be able to satisfy high real-time performance required for the mechanism controller processing. Therefore, there is a need for an image formation apparatus capable of performing a mechanism controller processing and a controller processing with a single multi-core processor.

The present disclosure has been made to solve the above problem, and an object in one aspect is to provide an image formation apparatus capable of performing a mechanism controller processing and a controller processing with a single multi-core processor.

To achieve at least one of the abovementioned objects, according to an aspect of the present invention, an image formation apparatus reflecting one aspect of the present invention comprises a multi-core processor having a plurality of cores, and an image forming mechanism configured to form an image on a recording medium. At least one of the plurality of cores includes a switching controller configured to switch a first OS run by the core for performing a mechanism controller processing to control the image forming mechanism and a second OS run by the core for performing a controller processing.

Preferably, the controller processing includes at least one of an image processing, a user interface processing, a network processing, a storage device processing, a facsimile processing, and a mail processing.

Preferably, the image formation apparatus is configured to switch a plurality of operation modes. The multi-core processor is configured in a first operation mode of the plurality of operation modes to perform the mechanism controller processing by a core and the controller processing by a different core and in a second operation mode of the plurality of operation modes to perform the mechanism controller processing and the controller processing by a single core.

Still preferably the switching controller is configured to prioritize the mechanism controller processing over the controller processing.

Preferably, the multi-core processor includes a shared memory accessible by each of the plurality of cores. A core which runs the first OS and a core which runs the second OS communicate with each other based on the shared memory.

Preferably, the image forming mechanism includes a fixing device configured to fix an image on a recording medium. The multi-core processor is configured such that when the multi-core processor is activated while a core which runs the second OS is performing a processing to initialize the second OS a core which runs the first OS performs a mechanism controller processing to control the fixing device.

Preferably, the image formation apparatus is configured to switch a plurality of operation modes. The multi-core processor is configured to determine among the plurality of cores a core which performs the mechanism controller processing and a core which performs the controller processing in accordance with the operation mode.

Still preferably, the multi-core processor is configured to perform the mechanism controller processing and the controller processing by a smaller number of cores than the plurality of cores in accordance with the operation mode, and interrupt power supplied to a core among the plurality of cores which does not perform any of the mechanism controller processing and the controller processing.

Preferably, the operation mode includes a print mode indicating that the image forming mechanism is currently performing a printing processing. When the operation mode is the print mode, the multi-core processor determines among the plurality of cores a core which performs the mechanism controller processing and a core which performs the controller processing in accordance with the operation mode such that the cores are different cores.

Still preferably, the multi-core processor is configured to perform the mechanism controller processing by a predetermined one of the plurality of cores when the operation mode is the print mode.

Preferably, the operation mode includes at least one of a scan mode for reading an original document by a document reading device and a FAX mode for transmitting and receiving image information to and from an external device. The multi-core processor is configured to perform the mechanism controller processing and the controller processing by a number of cores which is smaller than that of cores used in the print mode when the operation mode is the scan mode or the FAX mode.

Preferably, the image formation apparatus further comprises a density sensor configured to detect a density of an image formed by the image forming mechanism. The operation mode includes an image stabilization mode to control an image forming condition in the image forming mechanism based on a result of detection done by the density sensor. The multi-core processor is configured to perform the mechanism controller processing by two or more of the plurality of cores when the operation mode is the image stabilization mode.

Preferably, the operation mode includes a standby mode in which the image forming mechanism is ready for forming an image. The multi-core processor is configured to perform the mechanism controller processing and the controller processing by one of the plurality of cores when the operation mode is the standby mode.

Preferably, the operation mode includes a sleep mode to suppress power consumption of the image formation apparatus. The multi-core processor is configured to perform the controller processing by one of the plurality of cores when the operation mode is the sleep mode.

Preferably, the image formation apparatus further comprises a transporting path configured to transport the recording medium. The multi-core processor is configured to increase a number of cores among the plurality of cores that perform the mechanism controller processing when a number of recording media on the transporting path is equal to or more than a predetermined number.

Preferably, the image formation apparatus is configured to allow a sheet feeding device to be attached thereto for supplying a recording medium to the image formation apparatus. The multi-core processor sets a number of cores among the plurality of cores that perform the mechanism controller processing to a larger number when the sheet feeding device is attached to the image formation apparatus than when the sheet feeding device is not attached to the image formation apparatus.

Preferably, the image formation apparatus further comprises a sensor configured to detect a state of the image formation apparatus. The multi-core processor is configured such that when the multi-core processor performs a data analysis processing based on a result of detection done by the sensor the multi-core processor allows one of the plurality of cores to perform the data analysis processing alone.

Preferably, when a core which performs the mechanism controller processing has a load exceeding a predetermined load the multi-core processor causes a core which performs the controller processing and has a smallest load among the at least one core including the switching controller to perform a portion of the mechanism controller processing.

Still preferably, the multi-core processor determines the portion of the mechanism controller processing based on at least one of: how many times the processing is activated; and a period of time required for the processing.

Preferably, when the multi-core processor performs the controller processing by two or more of the plurality of cores including first and second cores and the first and second cores together have a total load less than a predetermined load, the multi-core processor performs by one of the first and second cores having a larger load a controller processing performed by one of the first and second cores having a smaller load.

Still preferably, when a core which performs the mechanism controller processing transmits a predetermined amount or more of data to a core which performs the controller processing based on the shared memory, the multi-processor core causes a core which performs the controller processing and includes the switching controller that performs a communication processing in the second OS to perform a communication processing performed in the first OS.

Still preferably, the image formation apparatus further comprises a sensor configured to detect a state of the image formation apparatus. The predetermined amount or more of data includes a result of detection done by the sensor used for detecting an error of the image formation apparatus.

Still preferably, the predetermined amount or more of data includes log data necessary for determining a cause of the error of the image formation apparatus when the error is detected.

Preferably, the image formation apparatus further comprises a peripheral circuit used for performing the mechanism controller processing. The multi-core processor is configured to perform a mechanism controller processing by one of the plurality of cores to access the peripheral circuit.

Preferably, the image formation apparatus further comprises a peripheral circuit used for performing the mechanism controller processing. The multi-core processor is configured to prohibit access to the peripheral circuit from the controller processing performed in the second OS.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 4 is a diagram for illustrating a processing of a switching controller.

FIG. 5 is a sequential diagram showing an example of an initial operation of a multi-core processor.

FIG. 6 is a flowchart of a processing of transmitting/receiving data between a general-purpose OS and an RTOS using a shared memory.

FIG. 7 is a flowchart showing processings performed by the general-purpose OS and the RTOS as an operation mode is switched.

FIG. 8 is a diagram showing an example of a data structure of a switching table.

FIG. 9 is a flowchart showing a processing to migrate a mechanism controller processing from a mechanism controller core to a controller core.

FIG. 10 is a flowchart of a processing for reducing the number of controller cores.

DETAILED DESCRIPTION OF EMBODIMENTS

Hereinafter, one or more embodiments of the present invention will be described with reference to the drawings. However, the scope of the invention is not limited to the disclosed embodiments. In the following description, identical components are identically denoted. Their names and functions are also identical. Accordingly, they will not be described redundantly in detail. Note that each embodiment and each modification described below may be selectively combined as appropriate.

[Configuration of Image Formation Apparatus]

Figure 1:
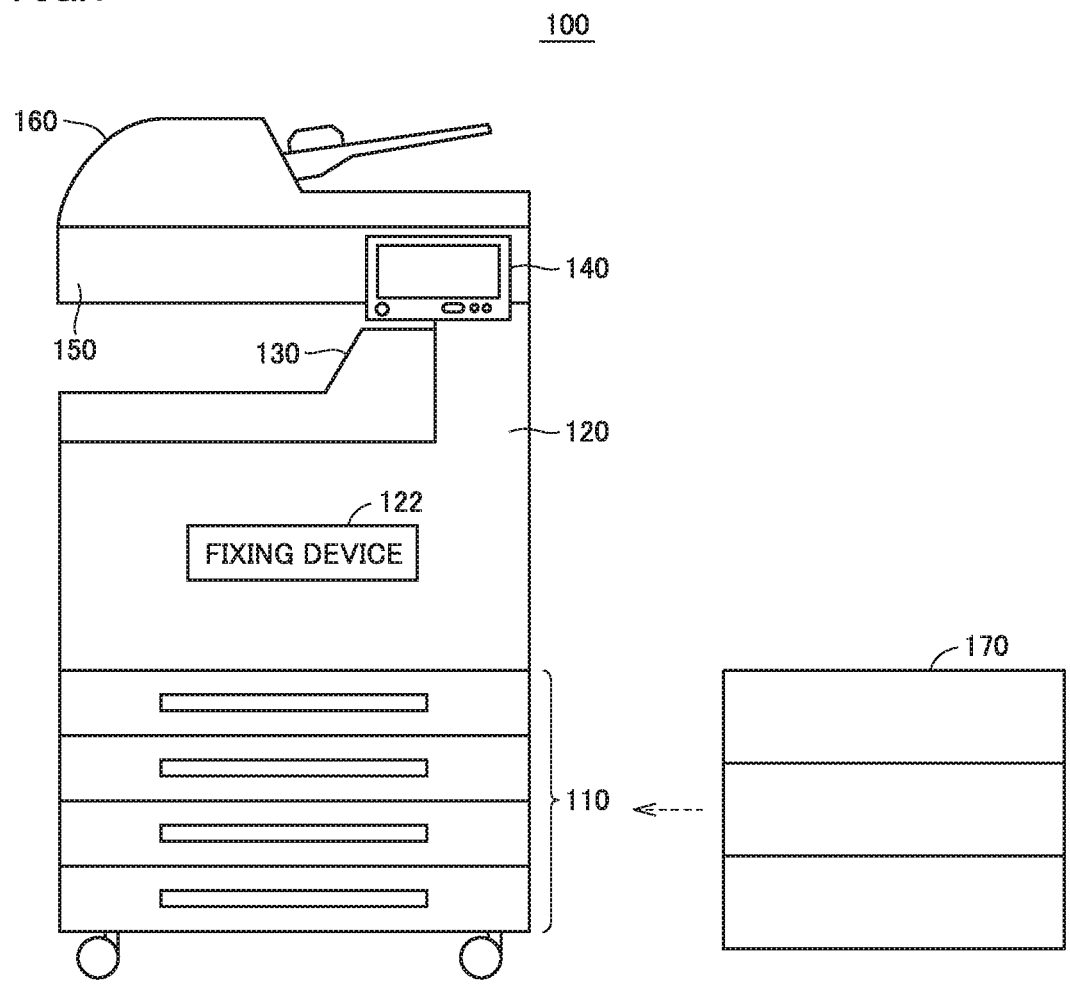
FIG. 1 is a diagram showing an external configuration of an image formation apparatus according to an embodiment.

FIG. 1 is a diagram showing an external configuration of an image formation apparatus 100 according to an embodiment. With reference to FIG. 1, image formation apparatus 100 includes a plurality of sheet feeding cassettes 110, an image forming mechanism 120, a sheet discharging tray 130, a console panel 140, a scanner 150, and an ADF (Auto Document Feeder) 160.

Each sheet feeding cassette 110 stores sheets (or a recording medium) therein. In response to a print instruction being received, sheet feeding cassette 110 sends a sheet to a transporting path. As a result, the sheet is supplied to image forming mechanism 120.

Image forming mechanism 120 includes various devices, including a fixing device 122, necessary for forming an image on a sheet. As an example, image forming mechanism 120 includes a photoreceptor, a charging device, an exposure device, a developing device, and a primary transfer device (not shown) for each color of Y (yellow), M (magenta), C (cyan) and K (black). Further, image forming mechanism 120 further includes an intermediate transfer member and a secondary transfer device (not shown). Image forming mechanism 120 employs well-known electrophotography to form an image on the sheet by these devices. The sheet with the image formed thereon by image forming mechanism 120 is discharged to sheet discharging tray 130.

Console panel 140 includes a touch screen, a display, and a plurality of physical buttons. Console panel 140 outputs a signal representing contents input by a user to a multi-core processor 200 described later.

Scanner 150 functions as a document reading device that optically reads an original document placed on a platen glass (not shown). Scanner 150 outputs read image information to multi-core processor 200. ADF 160 sends sheets stacked thereon from an uppermost sheet to the transporting path successively.

Image formation apparatus 100 is configured to be connectable to sheet feeding device 170. Sheet feeding device 170 accommodates a plurality of sheets. Further, sheet feeding device 170 sends out the accommodated sheets to a transporting path leading to image forming mechanism 120.

Figure 2:
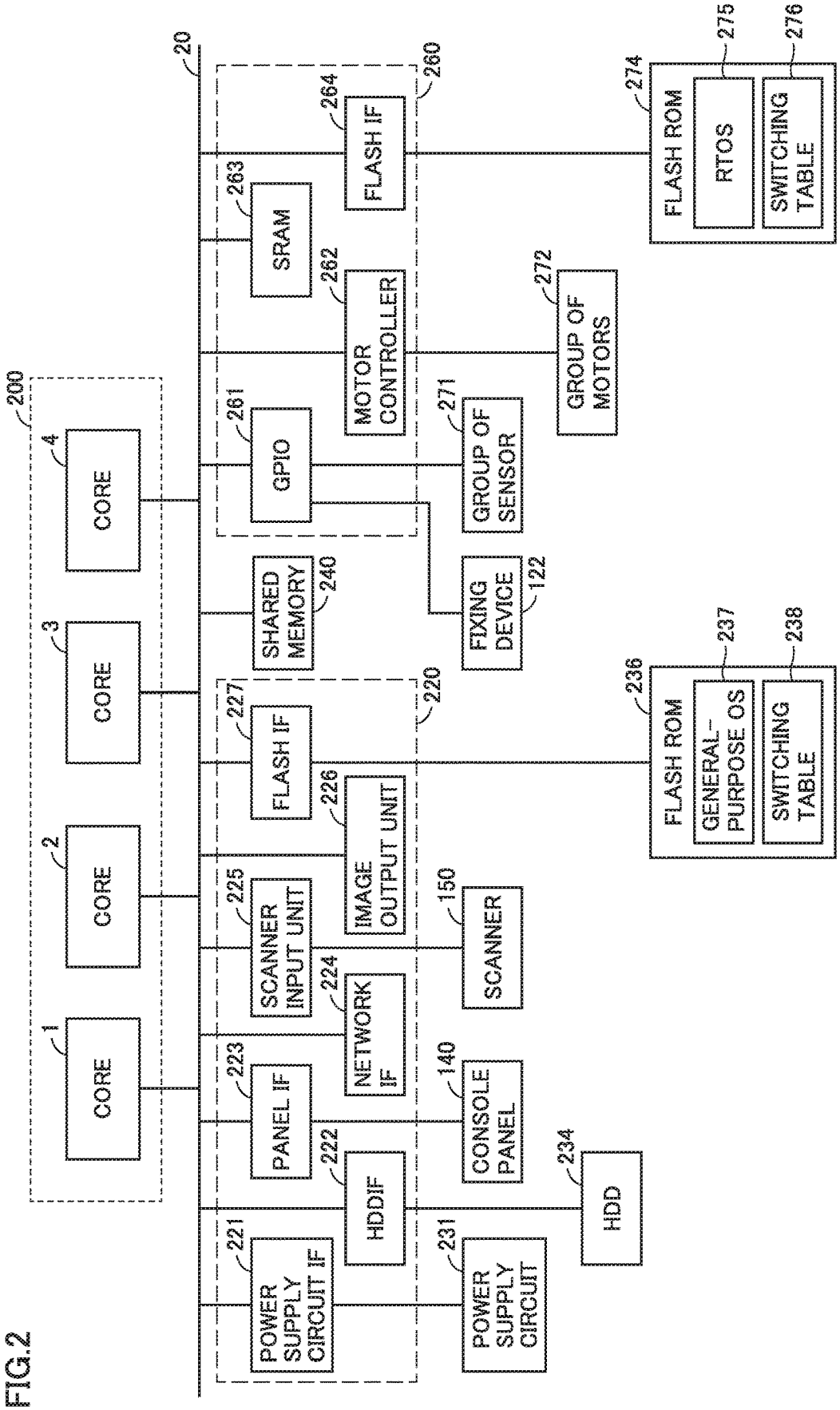
FIG. 2 is a diagram showing an electrical configuration of the image formation apparatus according to the embodiment.

FIG. 2 is a diagram showing an electrical configuration of image formation apparatus 100 according to the embodiment. As shown in FIG. 2, image formation apparatus 100 includes a multi-core processor 200 having a plurality of cores.

Multi-core processor 200 has a core 1, a core 2, a core 3, and a core 4 for a total of four cores. Cores 1 to 4 are each connected to a bus 210.

A controller peripheral circuit 220, a shared memory 240, and a mechanism controller peripheral circuit 260 are further connected to bus 210.

Controller peripheral circuit 220 includes a power supply circuit IF (interface) 221, an HDD (Hard Disk Drive) IF 222, a panel IF 223, a network IF 224, a scanner input unit 225, an image output unit 226, and a flash IF 227.

Power supply circuit IF 221 is connected to power supply circuit 231. Power supply circuit 231 supplies power to various devices. HDD IF 222 is connected to HDD 234. HDD 234 stores image information and the like.

Panel IF 223 is connected to console panel 140. Panel IF 223 outputs to multi-core processor 200 a signal indicating a user operation input to console panel 140. Network IF 224 is a card or a board for connecting to an external client terminal (for example, a personal computer), and, by way of example, outputs to multi-core processor 200 data of a print job input from the client device via a LAN (Local Area Network).

Scanner input unit 225 outputs to multi-core processor 200 image information read by scanner 150. Image output unit 226 generates dot data used for forming an image based on image information input from scanner 150 via scanner input unit 225 or image information input from an external client device.

Flash IF 227 is connected to flash ROM 236. Flash ROM 236 stores a general-purpose OS 237 and a switching table 238. Switching table 238 will be described later.

Controller peripheral circuit 220 is a circuit used for multi-core processor 200 to perform a controller processing. The controller processing includes an image processing, a user interface processing, a network processing, a storage device processing, a facsimile processing, a mail processing, and the like.

For example, the image processing refers for example to a processing based on image information input from scanner 150 via scanner input unit 225 or image information input from an external client device via network IF 224.

The user interface processing refers for example to a processing to allow multi-core processor 200 to transmit and receive data to and from the console panel via panel IF 223.

The network processing refers to a processing necessary for allowing multi-core processor 200 to transmit and receive data to and from an external device (for example, processings in TCP (Transmission Control Protocol), IP (Internet Protocol), Ethernet®).

The storage device processing refers for example to a processing to allow multi-core processor 200 to access data stored in HDD 234 via HDD IF 222.

The facsimile processing refers for example to a processing to allow multi-core processor 200 to transmit and receive image information to and from an external device via network IF 224.

The mail processing refers for example to a processing to allow multi-core processor 200 to transmit and receive e-mail to and from an external device via network IF 224.

Shared memory 240 is a memory accessible by any one of cores 1 to 4, and can be composed of volatile memory. As an example, shared memory 240 is composed of SRAM (Static Random Access Memory).

Mechanism controller peripheral circuit 260 includes a GPIO (General-Purpose Input/Output) 261, a motor controller 262, an SRAM 263, and a flash IF 264.

GPIO 261 is connected to fixing device 122 and a group of sensors 271. The group of sensors 271 includes, for example, a sheet detection sensor for optically detecting that a sheet has passed on the transporting path, a density sensor for optically detecting the density of a toner image primarily transferred onto the intermediate transfer belt, and other various sensors for detecting the state of image formation apparatus 100.

Motor controller 262 is connected to a motor group 272. Motor group 272 includes various motors such as a motor for driving a transporting roller for transporting a sheet and a motor for driving the photoreceptor.

SRAM 263 functions as a working memory of a core that performs a mechanism controller processing for controlling image forming mechanism 120. Flash IF 264 is connected to a flash ROM 274. Flash ROM 274 stores an RTOS 275 and a switching table 276. Switching table 276 will be described later.

In another aspect, mechanism controller peripheral circuit 260 may include an RTC (Real Time Clock), an I2C (Inter-Integrated Circuit), an SPI (Serial Peripheral Interface), a UART (Universal Asynchronous Receiver Transmitter), and the like.

Mechanism controller peripheral circuit 260 is used to perform a mechanism controller processing for multi-core processor 200 to control image forming mechanism 120. The mechanism controller processing includes a processing performed periodically (hereinafter also referred to as a "periodic processing") and a processing performed in response to an event. The periodic processing includes processing performed for example every 1 ms, every 10 ms, and every 100 ms. More specifically, the periodic processing includes a processing to control motor group 272 according to a result of detection done by the sheet detection sensor, a processing to control the charging device, developing device, transfer device, and motor group 272 included in image forming mechanism 120 to form a toner image, a processing to adjust the temperature of a heater (not shown) included in fixing device 122 (hereinafter also referred to as a "temperature adjustment processing"), a processing to drive motor group 272 on the transporting path to transport a sheet, and the like. Furthermore, the mechanism controller processing includes a processing to allow multi-core processor 200 to obtain via GPIO 261 a result of detection done by sensor group 271.

[Comparison of General Purpose OS 237 and RTOS 275]

General-purpose OS 237 performs a plurality of processings such as memory management and file management in a time division manner (a round robin manner). For general-purpose OS 237 there are a large amount of data that must be managed because the OS is of highly performance. Therefore, general-purpose OS 237 must save a large amount of management data in memory and return the data from memory when switching processings (or tasks), which consumes a long period of time (for example of several msec) to switch the processings. Therefore, it is difficult for general-purpose OS 237 to perform the mechanism controller processing (for example, a periodic processing to be performed every 1 ms), which requires high realtime performance precisely as timed. If the mechanism controller processing is not performed precisely as timed, for example, a jam caused by a motor losing synchronization, an offset in timing of detection done by the sheet detection sensor and hence an offset of a position at which writing an image is started, erroneous jam detection, and the like may occur.

In contrast, RTOS 275 does not perform a plurality of processings in a time division manner; rather, the OS performs them in accordance with a predetermined order of priority. Therefore, while a first processing is currently performed when a second processing having a higher priority than the first processing is input RTOS 275 preferentially performs the second processing. Therefore, RTOS 275 has higher real-time performance than general-purpose OS 237.

[Switching Controller for Switching OSs]

Figure 3:
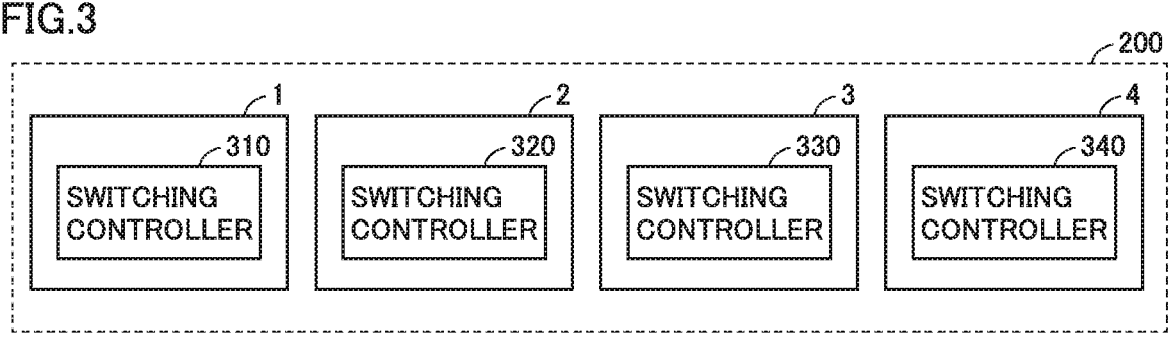
FIG. 3 is a block diagram showing a configuration of a core.

FIG. 3 is a block diagram showing a configuration of cores 1-4. As shown in FIG. 3, core 1 has a switching controller 310, core 2 has a switching controller 320, core 3 has a switching controller 330, and core 4 has a switching controller 340.

Switching controllers 310 to 340 are functionally identical, and accordingly, a function of switching controller 310 will be described. Switching controller 310 switches RTOS 275 for performing the mechanism controller processing and general-purpose OS 237 for performing the controller processing as OSs to be run by core 1 corresponding thereto.

More specifically, each of cores 1 to 4 has a privileged mode and a user mode. The privileged mode operates in preference to the user mode. Switching controller 310 switches the privileged mode of core 1 and the user mode of core 1 to switch RTOS 275 and general-purpose OS 237. RTOS 275 corresponds to the privileged mode, and general-purpose OS 237 corresponds to the user mode. Hereinafter, with reference to FIG. 4, when switching controller 310 switches the OSs will be described.

FIG. 4 is a diagram for illustrating a processing of switching controller 310. Referring to FIG. 4, core 1 starts to receive power at time T1. Along with this, switching controller 310 performs a processing to boot RTOS 275 from time T1 to time T2.

From time T2 to time T3, core 1 performs a plurality of mechanism controller processings on RTOS 275 (each square in FIG. 4 represents a unit of processing (or a task)). When there is no mechanism controller processing to be performed, the above process is omitted.

At time T3, in response to all mechanism controller processings being completed, switching controller 310 performs a processing to initialize general-purpose OS 237 in order to switch an OS run by core 1 from RTOS 275 to general-purpose OS 237.

At time T4, core 1 starts a processing to boot general-purpose OS 237. At time T5, an interrupt on the side of RTOS 275 occurs during the processing to boot general-purpose OS 237. In response, switching controller 310 performs a processing to initialize RTOS 275 in order to switch an OS run by core 1 from general-purpose OS 237 to RTOS 275. At time T6, core 1 performs on RTOS 275 a mechanism controller processing 410 corresponding to the interrupt that occurred at time T5.

At time T7, an interrupt of a mechanism controller processing 430 occurs while a mechanism controller processing 420 is performed. In response, core 1 interrupts mechanism controller processing 420 and performs mechanism controller processing 430, and once mechanism controller processing 430 has been completed, or at time T8, core 1 resumes mechanism controller processing 420 that has been interrupted.

At time T9, in response to all mechanism controller processings being completed, switching controller 310 performs a processing to initialize general-purpose OS 237 in order to switch an OS run by core 1 from RTOS 275 to general-purpose OS 237. At time T10, core 1 resumes the processing to boot general-purpose OS 237, and completes the processing at time T11. Thereafter, core 1 performs a controller processing 440 on general-purpose OS 237.

At time T12, an interrupt on the side of RTOS 275 occurs. In response, switching controller 310 performs a processing to initialize RTOS 275 in order to switch an OS run by core 1 from general-purpose OS 237 to RTOS 275. At time T13, core 1 performs on RTOS 275 a mechanism controller processing 450 corresponding to the interrupt that occurred at time T12.

At time T14, an interrupt on the side of general-purpose OS 237 occurs while mechanism controller processing 450 is performed. In such a case, a controller processing 460 corresponding to that interrupt is suspended until all mechanism controller processings are completed. Therefore, after core 1 performs initialization of general-purpose OS 237 from time T15 to time T16, core 1 performs controller processing 460 on general-purpose OS 237.

Thus, switching controller 310 performs processings of (1) performing a processing to boot RTOS 275 upon power-on, (2) in response to any mechanism controller processing to be performed being completed, switching an OS run by the associated core 1 to general-purpose OS 237, and (3) when an interrupt of RTOS 275 occurs while a controller processing is performed, switching an OS run by the associated core 1 to RTOS 275. As indicated by the processings (2) and (3), switching controller 310 gives priority to the mechanism controller processing over the controller processing.

According to the above, by an operation of switching controllers 310 to 340, cores 1 to 4, respectively, can each perform a controller processing, and also perform a mechanism controller processing precisely as timed without delay, and can thus suppress a trouble caused by a delay of the mechanism controller processing (such as jamming).

[Processing by Multi-Core Processor at Power ON]

Hereinafter will be described a processing of multi-core processor 200 when image formation apparatus 100 starts to receive power. As one example, when image formation apparatus 100 starts to receive power, core 1 to core 3 of multi-core processor 200 are configured to perform a controller processing on general-purpose OS 237 and core 4 is configured to perform a mechanism controller processing on RTOS 275.

FIG. 5 is a sequential diagram showing an example of an initial operation of multi-core processor 200. In step S510, image formation apparatus 100 including multi-core processor 200 starts to receive power. As image formation apparatus 100 starts to receive power, multi-core processor 200 has one of cores 1-4 activated. "Activate" means that a device is powered and starts operation. In the example shown in FIG. 5, core 1 is activated.

In step S515, switching controller 310 of core 1 performs a processing to boot RTOS 275 and a processing to initialize RTOS 275. In step S520, switching controller 310 of core 1 activates the other cores 2 to 4.

In step S525, core 2 performs a processing to initialize RTOS 275. In step S530, core 3 performs a processing to initialize RTOS 275. The processing to initialize RTOS 275 in steps S515, S525, and S530 is a processing performed to confirm that there is no processing performed on RTOS 275 (i.e., no mechanism controller processing). In step S535, cores 1 to 3 perform a processing to initialize general-purpose OS 237.

In step S540, core 4 performs a processing to initialize RTOS 275. In step S545, after RTOS 275 is initialized, core 4 performs a processing to initialize GPIO 261. In step S550, core 4 performs a temperature adjustment processing (a warm-up processing) for adjusting the temperature of a heater (not shown) so that a heating roller included in fixing device 122 attains a predetermined temperature. In step S555, core 4 performs another mechanism controller processing to be performed.

In step S560, cores 1 to 3 perform a controller processing on general-purpose OS 237.

The processing to initialize general-purpose OS 237 indicated in step S535 requires a long period of time (for example of 10 seconds or more). During this processing, core 4 performs on RTOS 275 the mechanism controller processings indicated in steps S545 to S555. Thus, image formation apparatus 100 according to the embodiment can shorten a period of time consumed after the apparatus starts to receive power before the apparatus is ready for printing.

[Inter-OS Communication]

Hereinafter will be described communication between general-purpose OS 237 and RTOS 275. In the present embodiment, general-purpose OS 237 and RTOS 275 perform data transmission and reception therebetween using shared memory 240 accessible by any of cores 1 to 4. More specifically, general-purpose OS 237 and RTOS 275 each have a shared memory transmission function and a shared memory reception function, and execute these functions to transmit and receive data. A specific processing will be described with reference to FIG. 6.

FIG. 6 is a flowchart of a processing of transmitting/receiving data between general-purpose OS 237 and RTOS 275 using shared memory 240. In the example of FIG. 6, core 1 runs general-purpose OS 237, and core 4 runs RTOS 275.

Referring to FIG. 6, steps S610 to S630 represent a processing to transmit data from general-purpose OS 237 to RTOS 275, and steps S660 to S680 represent a processing to transmit data from RTOS 275 to general-purpose OS 237.

In step S610, general-purpose OS 237 (core 1) executes a shared memory transmission function to transmit data to RTOS 275. As a result, general-purpose OS 237 (core 1) stores in shared memory 240 data to be transmitted (step S615). In step S620, general-purpose OS 237 (core 1) interrupts RTOS 275 (core 4) for reception.

In step S625, in response to the interrupt for reception, RTOS 275 (core 4) executes a shared memory reception function. As a result, RTOS 275 (core 4) receives from shared memory 240 the data stored therein to be transmitted (step S630).

In step S660, RTOS 275 (core 4) executes a shared memory transmission function to transmit data to general-purpose OS 237. As a result, RTOS 275 (core 4) stores in shared memory 240 data to be transmitted (step S665). In step S670, RTOS 275 (core 4) interrupts general-purpose OS 237 (core 1) for reception.

In step S675, in response to the interrupt for reception, general-purpose OS 237 (core 1) executes a shared memory reception function. As a result, general-purpose OS 237 (core 1) receives from shared memory 240 the data stored therein to be transmitted (step S680).

According to the above, general-purpose OS 237 and RTOS 275 can communicate with each other using shared memory 240. Conventionally, an image formation apparatus which performs a mechanism controller processing and a controller processing by two different processors had to have a dedicated communication line or the like for performing communications between the two processors. In contrast, image formation apparatus 100 that uses shared memory 240 according to the embodiment allows communications between general-purpose OS 237 and RTOS 275 to be performed without using the dedicated communication line. Therefore, image formation apparatus 100 can save more cost and more space than a conventional image formation apparatus.

[Control Depending on Operation Mode]

Image formation apparatus 100 has a plurality of operation modes. As an example, image formation apparatus 100 is configured to be capable of switching a print mode, a scan mode, a FAX mode, an image stabilization mode, a standby mode, and a sleep mode.

The print mode represents that image formation apparatus 100 is performing a print job, in other words, that image forming mechanism 120 is performing a processing for printing. The scan mode represents that image formation apparatus 100 is performing a scan job, in other words, that scanner 150 is reading an original document, and that ADF 160 is transporting an original document toward scanner 150.

The FAX mode represents that image formation apparatus 100 is performing a FAX job, in other words, that image formation apparatus 100 communicates image information with an external device. The image stabilization mode represents that image formation apparatus 100 is performing an image stabilization processing. The image stabilization processing represents a processing performed to control an image forming condition in image forming mechanism 120 based on a density of a toner image sensed by the density sensor included in sensor group 271.

The standby mode represents that image forming mechanism 120 is waiting in a state ready for forming an image (for example, a state which keeps the heating roller in the fixing device at a prescribed temperature). The sleep mode represents that, in order to suppress power consumption of image formation apparatus 100, power supplied to a device excluding some control system (for example, core 1) is interrupted.

In each of these operation modes, multi-core processor 200 is required to perform different mechanism controller processing and different controller processing. Therefore, image formation apparatus 100 according to the embodiment optimizes the processings by switching a processing performed by each of cores 1 to 4 depending on the operation mode. In addition, image formation apparatus 100 reduces power consumption by interrupting power supplied to a core that does not perform any of the mechanism controller processing and the controller processing.

Reference will be made to FIGS. 7 and 8 to specifically describe control depending on the operation mode. FIG. 7 is a flowchart showing processings performed by general-purpose OS 237 and RTOS 275 as an operation mode is switched. FIG. 8 shows an example of a data structure for each of switching table 238 and switching table 276.

the processing of general-purpose OS 237 and the processing of RTOS 275 in FIG. 7 are substantially identical, and accordingly, the processing of general-purpose OS 237 will be described below. In step S710, general-purpose OS 237 determines whether an operation mode of image formation apparatus 100 has been switched. If it is determined that the operation mode has been switched (YES in step S710), general-purpose OS 237 refers to switching table 238 to determine a core which performs a controller processing in the switched operation mode (hereinafter also referred to as a "controller core").

In step S730, general-purpose OS 237 outputs a prescribed signal to the switching controller of a prescribed one of such determined cores. The switching controller having received the prescribed signal switches an OS run by the associated core to general-purpose OS 237. More specifically, the switching controller changes the mode of the associated core to the user mode and performs a processing to initialize general-purpose OS 237. Thereafter, the determined core performs the controller processing on general-purpose OS 237. The prescribed core represents a core which has not performed the controller processing (that is, a core which is performing the mechanism controller processing and a core which is not activated) before an operation mode is switched.

For RTOS 275, switching table 276 is referred to determine a core which performs a mechanism controller processing (hereinafter also referred to as a "mechanism controller core") in the switched operation mode (step S720), and the determined core performs the mechanism controller processing.

In switching table 238 and switching table 276 of FIG. 8, "general purpose OS" indicates that an associated core performs the controller processing, "RTOS" indicates that an associated core performs the mechanism controller processing, and "OFF" indicates that an associated core does not perform either the controller processing or the mechanism controller processing. Hereinafter, each core's processing in each operation mode will be described below.

(Print Mode)

Referring to FIG. 8, in the print mode, cores 1 to 3 perform the controller processing on general purpose OS 237, and core 4 performs the mechanism controller processing on RTOS 275. More specifically, cores 1 to 3 act as controller cores to perform an image processing, a scan processing, a network processing, a user interface processing, and a processing of communication with a mechanism controller core (hereinafter also referred to as a "communication processing"). Core 4 acts as a mechanism controller core to control those of the group of motors 272 which are provided for image forming mechanism 120, scanner 150, ADF 160 and the transporting path, and perform the temperature adjustment processing.

Thus, multi-core processor 200 divides the cores into a controller core and a mechanism controller core in the print mode. In addition, multi-core processor 200 performs the mechanism controller processing by a predetermined single mechanism controller core (core 4) in the print mode.

(Scan Mode/FAX Mode)

In the scan mode or the FAX mode, core 1 and core 2 perform the controller processing on general-purpose OS 237, and core 4 performs the mechanism controller processing on RTOS 275. More specifically, core 1 and core 2 act as controller cores to perform the scan processing, the network processing, the user interface processing, and the communication processing, and core 4 acts as a mechanism controller core to control those of the group of motors 272 which are provided for scanner 150 and ADF 160.

There are fewer processings performed in the scan mode or the FAX mode than in the print mode. Therefore, multi-core processor 200 in the scan mode or the FAX mode performs the mechanism controller processing and the controller processing by using a smaller number of cores (three cores) than that of cores (four cores) used in the print mode.

Core 3 does not perform either the controller processing or the mechanism controller processing. Therefore, multi-core processor 200 interrupts power supplied to core 3.

(Image Stabilization Mode)

In the image stabilization mode, core 1 performs the controller processing on general-purpose OS 237, and core 2 and core 3 perform the mechanism controller processing on RTOS 275. More specifically, core 1 acts as a controller core to perform a processing of calculating an image forming condition, the network processing, the user interface processing, and the communication processing. Core 2 and core 3 act as mechanism controller cores to perform a processing to obtain from sensor group 271 data necessary for performing the image stabilization processing and standardize the data, and control those of the group of motors 272 which are provided for image forming mechanism 120 and the transporting path.

Thus, the mechanism controller processing in the image stabilization mode has a heavier load than the mechanism controller processings in the other modes. Therefore, in the image stabilization mode, multi-core processor 200 performs the mechanism controller processing by two or more of the plurality of cores.

Core 4 does not perform either the controller processing or the mechanism controller processing. Therefore, multi-core processor 200 interrupts power supplied to core 4.

(Standby Mode)

In the standby mode, core 1 performs both the mechanism controller processing and the controller processing. More specifically, in the standby mode, core 1 runs RTOS 275 and general-purpose OS 237 at substantially the same time as switching controller 310 functions as described in FIG. 4.

In the standby mode, core 1 acts as a controller core to perform the network processing and acts as a mechanism controller core to perform the temperature adjustment processing. Thus in the standby mode the controller processing and the mechanism controller processing have small loads. Therefore, in the standby mode, multi-core processor 200 performs the mechanism controller processing and the controller processing by a single one of the plurality of cores.

Core 1 to core 3 do not perform either the controller processing or the mechanism controller processing. Therefore, multi-core processor 200 interrupts power supplied to cores 1-3.

(Sleep Mode)

In the sleep mode, core 1 acts as a controller core to perform the network processing. In the sleep mode, the mechanism controller processing is not performed. Therefore, in the sleep mode, multi-core processor 200 performs the controller processing by a single one of the plurality of cores.

Core 1 to core 3 do not perform either the controller processing or the mechanism controller processing. Therefore, multi-core processor 200 interrupts power supplied to cores 1-3.

As an example, a processing of multi-core processor 200 when the image stabilization mode is switched to the print mode will be described. General-purpose OS 237 determines with reference to switching table 238 that core 1 to core 3 are cores which perform the controller processing, and RTOS 275 determines with reference to switching table 276 that core 4 is a core which performs the mechanism controller processing. Core 2 and core 3 are switched from RTOS 275 to general-purpose OS 237. Therefore, general-purpose OS 237 notifies core 2 and core 3 of a prescribed signal. In response to the prescribed signal being received, switching controllers 320 and 330 change the modes of the associated cores 2 and 3 to the user mode and perform a processing to initialize general-purpose OS 237. Thereafter, cores 1 to 3 perform the controller processing on general-purpose OS 237. Further, as power supplied to core 4 has been interrupted, core 1 activates core 4. After switching controller 340 initializes RTOS 275, core 4 performs the mechanism controller processing on RTOS 275.

According to the above, image formation apparatus 100 according to the embodiment can perform the mechanism controller processing and the controller processing by using an optimal core corresponding to an operation mode. In addition, image formation apparatus 100 reduces power consumption by interrupting power supplied to a core which does not perform either the mechanism controller processing or the controller processing.

Further, image formation apparatus 100 divides cores into a core which performs the controller processing and a core which performs the mechanism controller processing in the print mode, the scan mode, the FAX mode, and the image stabilization mode. As a result, each core 1 to 4 basically does not switch general-purpose OS 237 and RTOS 275 in these operation modes. As a result, an overhead that accompanies switching the OSs is reduced, and image formation apparatus 100 can efficiently perform the mechanism controller processing and the controller processing.

While in the above example general-purpose OS 237 is configured to determine a controller core by referring to switching table 238, it may be configured to avoid using a table and define a controller core to be used in advance on a program. RTOS 275 is similarly discussed.

[Migrating a Processing (or a Task)]

Hereinafter will be described a processing to migrate a part of the mechanism controller processing performed by a core on RTOS 275 to a core performing the controller processing on general-purpose OS 237. General-purpose OS 237 and RTOS 275 according to the present embodiment have a migration function for migrating a processing among cores 1 to 4. Such migration of processing is also referred to as task migration or process migration.

Basically, as has been described above, the number of mechanism controller cores is determined depending on the operation mode. However, when a mechanism controller core has a large load, multi-core processor 200 migrates part of the mechanism controller processing from the mechanism controller core to a core performing the controller processing. This is done in order to suppress a trouble (for example, jamming) caused when a mechanism controller core has a large load and does not preform the mechanism controller processing precisely as timed.

Migrating the mechanism controller processing results in an increased number of mechanism controller cores. As a result, the mechanism controller processing is distributed to each mechanism controller core, and a load per mechanism controller core is thus reduced.

(Number of Sheets in Machine)

As an example, when a number of sheets on the transporting path (or being transported) in image formation apparatus 100 in the print mode (hereinafter also referred to as a "number of sheets in the machine" for the sake of convenience) is large, multi-core processor 200 migrates a part of the mechanism controller processing from a mechanism controller core to a controller core. This is because the mechanism controller processing involved in transportation and image formation is performed for each sheet, and for a larger number of sheets in the machine the mechanism controller processing has a heavier load.

When the number of sheets in the machine reaches or exceeds a predetermined number, multi-core processor 200 migrates the mechanism controller processing from core 4 functioning as a mechanism controller core to one of cores 1 to 3 functioning as controller cores. For example, 8 sheets are a number of sheets predetermined for monochrome printing and 5 sheets are a number of sheets predetermined for color printing. For duplex printing, multi-core processor 200 counts one sheet as two sheets.

In one embodiment, multi-core processor 200 migrates the mechanism controller processing from core 4 to one of cores 1 to 3 that bears the smallest load. In that case, the core to which the mechanism controller processing is migrated may be configured to perform only the mechanism controller processing, or may be configured to perform both the mechanism controller processing and the controller processing.

(A Case in which Sheet Feeding Device is Attached)

When sheet feeding device 170 is attached to image formation apparatus 100, the transporting path is substantially long. As a result, the number of sheets in the machine increases. When a plurality of sheet feeding devices 170 can be connected to image formation apparatus 100, the number of sheets in the machine increases as the number of sheet feeding devices 170 connected to image formation apparatus 100 increases.

Accordingly, when image formation apparatus 100 is supplied with sheets from sheet feeding device 170, multi-core processor 200 migrates the mechanism controller processing from core 4 to any one of cores 1 to 3. In other words, multi-core processor 200 has the plurality of cores with a larger number thereof acting as mechanism controller cores when sheet feeding device 170 is attached to image formation apparatus 100 than when sheet feeding device 170 is not attached to image formation apparatus 100.

(Control Configuration)

FIG. 9 is a flowchart showing a processing to migrate a mechanism controller processing from a mechanism controller core to a controller core. In the example shown in FIG. 9, it is assumed that image formation apparatus 100 is operating in the print mode.

In step S910, RTOS 275 (core 4) monitors whether image formation apparatus 100 has a number of sheets in the machine which is the predetermined number of sheets or larger (for example, 8 sheets or more for monochromatic printing, and 5 sheets or more for color printing). If RTOS 275 (core 4) determines that the number of sheets in the machine has reached the predetermined number or more, RTOS 275 performs step S930.

In step S920, RTOS 275 (core 4) monitors whether the mechanism controller core has a load of 95% or more. When RTOS 275 (core 4) determines that the mechanism controller core has a load of 95% or more, RTOS 275 performs step S930.

In step S930, RTOS 275 (core 4) executes the migration function and notifies general-purpose OS 237 (core 1 to core 3) that the mechanism controller core has a heavy load.

In step S940, general-purpose OS 237 (core 1 to core 3) determines one of controller cores that has a smallest load. As an example, it is assumed that core 1 has a load of 80%, core 2 has a load of 60%, and core 3 has a load of 20%. In that case, general-purpose OS 237 determines that core 3 is the controller core having the smallest load. General-purpose OS 237 notifies RTOS 275 (core 4) of information (core 1D) which identifies the determined core.

In step S950, RTOS 275 (core 4) determines a mechanism controller processing to be migrated to the controller core based on how many times the processing is activated and the period of time required for the processing. More specifically, RTOS 275 (core 4) determines a processing (or task) which is activated less frequently (or has a long cycle) and requires a short period of time.

In step S960, RTOS 275 (core 4) migrates the mechanism controller processing determined in step S950 to core 3 corresponding to the core 1D indicated in step S940. More specifically, RTOS 275 (core 4) creates a snapshot such as a state of memory, a status of a register and the like of the mechanism controller processing to be migrated, and transmits the snapshot to core 3. A snapshot collectively refers to data extracted as timed as prescribed.

In step S970, after switching controller 330 initializes RTOS 275, core 3 restores a state of the migrated mechanism controller processing based on the snapshot received from core 4, and performs the mechanism controller processing.

In step S980, after the print job is completed, core 3 migrates the migrated mechanism controller processing to core 4.

Thus in image formation apparatus 100 according to the embodiment when a mechanism controller core has a large load the load is borne by an increased number of mechanism controller cores and a load per mechanism controller core can thus be reduced to suppress a problem otherwise caused as a mechanism controller core has a large load.

[Reducing the Number of Controller Cores]

In some aspect, a plurality of controller cores each have a small load and the controller processings performed by these controller cores may be able to be performed by a single controller core. In such a case, multi-core processor 200 reduces the number of controller cores and hence power consumption.

FIG. 10 is a flowchart of a processing for reducing the number of controller cores. In FIG. 10, cores 1 to 3 each act as a controller core to perform a controller processing on general-purpose OS 237.

In step S1010, general-purpose OS 237 (core 1 to core 3) monitors each controller core's load. As an example, it is assumed that core 1 has a load of 80%, core 2 has a load of 60%, and core 3 has a load of 20%.

In step S1020, general-purpose OS 237 (core 1 to core 3) determines whether two of cores 1 to 3 have a load less than 90% in total. Cores 2 and 3 have a load less than 80% in total, and general-purpose OS 237 determines that the condition is satisfied (YES in step S1020), and performs step S1030.

In step S1030, of two cores 2 and 3, core 3 having a smaller load migrates its currently performed controller processing to core 2 having a larger load. The migration between the cores will not be described repeatedly as it is done similarly as has been discussed above. In step S1040, multi-core processor 200 interrupts power supplied to core 3.

According to the above, image formation apparatus 100 according to the embodiment can suppress power consumption by controlling the number of controller cores to be activated depending on a load of a controller core.

[Data Analyzing Core]

In one aspect, multi-core processor 200 performs a data analysis processing based on a result of detection done by sensor group 271 to detect an error of image formation apparatus 100, determine an image forming condition of image forming mechanism 120, and the like.

Multi-core processor 200 according to the embodiment sets any of cores 1 to 4 as a core dedicated to performing the data analysis processing. For example, when there is a core which does not perform either the mechanism controller processing or the controller processing (hereinafter also referred to as an "available core"), multi-core processor 200 performs the data analysis processing by the available core. The core dedicated to the data analysis processing allows the data analysis processing to be efficiently performed.

If there is no available core, multi-core processor 200 migrates a processing of one of controller cores that has a smallest load to another controller core to create an available core. Then, multi-core processor 200 performs the data analysis processing by the available core.

While in principle a controller core performs the data analysis processing on general-purpose OS 237 by using various calculation libraries, a mechanism controller core may perform the data analysis processing on RTOS 275.

[Control During Communication of Large Amount of Data Between OSs]

Figure 11:
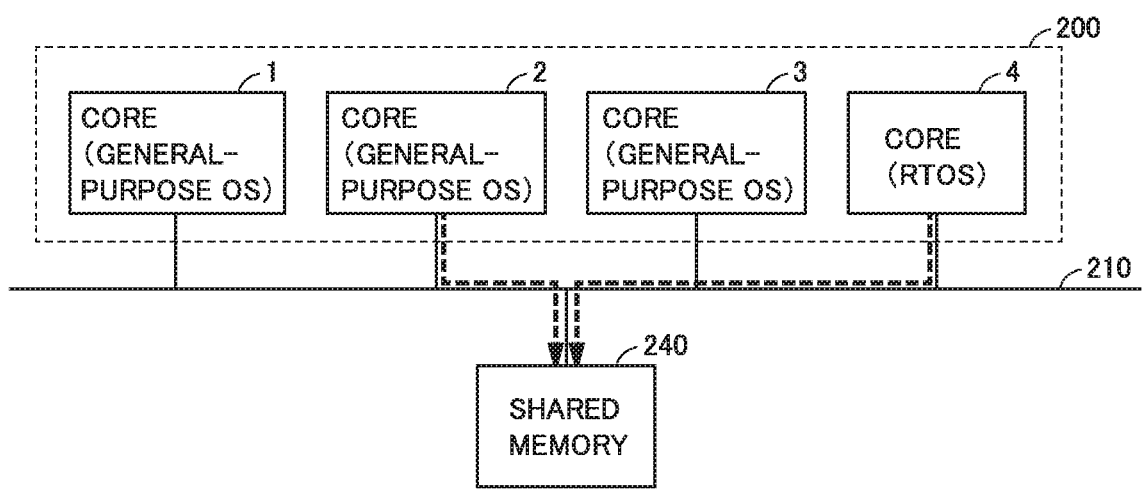
FIG. 11 is a diagram for illustrating communication between the general-purpose OS and the RTOS in an aspect.

FIG. 11 is a diagram for illustrating communication between general-purpose OS 237 and RTOS 275 in an aspect. In FIG. 11, of cores 1 to 3 acting as controller cores, core 2 performs a communication processing of general-purpose OS 237. Further, core 4 acting as a mechanism controller core performs a communication processing of RTOS 275. In such a situation, when a large amount of data is communicated from RTOS 275 to general-purpose OS 237, a conflict arises between core 2 and core 4 in accessing shared memory 240, as shown in FIG. 11. This is because a processing through which core 4 accesses shared memory 240 to store data therein conflicts with a processing through which core 2 reads data from shared memory 240.

In order to avoid such a conflict, a memory arbitration circuit (not shown) may be disposed between shared memory 240 and bus 210 in some cases. When there is an access from a core to shared memory 240, the memory arbitration circuit permits the core to access shared memory 240 when shared memory 240 is not used by any core other than the core accessing the memory.

However, when the memory arbitration circuit performs such an arbitration processing, a period of time required for a processing for transmitting data from RTOS 275 to general-purpose OS 237 would be increased by a period of time required for the arbitration processing.

Figure 12:
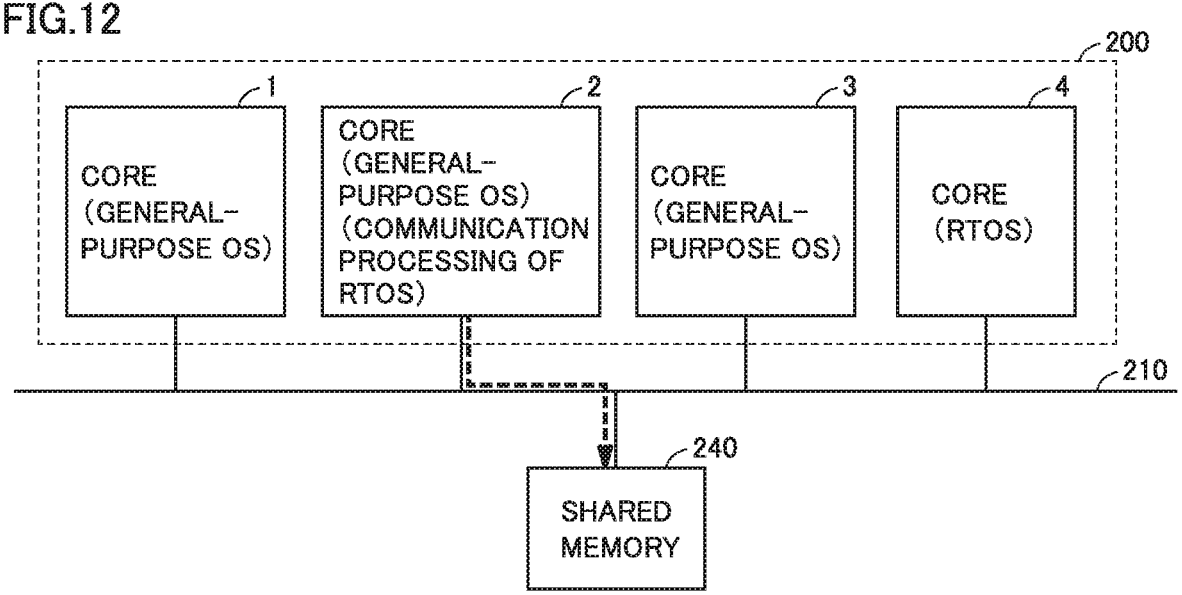
FIG. 12 is a diagram for illustrating communication between the general-purpose OS and the RTOS according to an embodiment.

FIG. 12 is a diagram for illustrating communication between general-purpose OS 237 and RTOS 275 according to an embodiment. When multi-core processor 200 according to the embodiment transmits a predetermined amount or more of data from RTOS 275 to general-purpose OS 237 by using shared memory 240, multi-core processor 200 migrates the communication processing of RTOS 275 to a core which performs the communication processing of general-purpose OS 237. In the example of FIG. 12, core 4 functioning as a mechanism controller core migrates the communication processing of RTOS 275 to core 2 that performs the communication processing of general-purpose OS 237. As a result, shared memory 240 is accessed by only a single core, and such a conflict as described above can be suppressed.

More specifically, although core 2 performs both a mechanism controller processing (the communication processing of RTOS 275) and a controller processing (the communication processing of general-purpose OS 237), core 2 preferentially performs the mechanism controller processing as switching controller 320 operates. Once the processing of transmitting data from RTOS 275 to general-purpose OS 237 has been completed, core 2 migrates the mechanism controller processing (the communication processing of RTOS 275) to core 4.

According to the above, when image formation apparatus 100 according to the embodiment performs a processing to transmit a large amount of data from RTOS 275 to general-purpose OS 237 it can do so while suppressing a conflict for shared memory 240 without using a memory arbitration circuit. Further, image formation apparatus 100 suppresses a period of time required for a memory arbitration processing.

For example, the predetermined amount or more of data may be a result of detection done by a sensor of sensor group 271 that is used for detecting an error of image formation apparatus 100. RTOS 275 can transmit a result of detection done by the sensor that is obtained during a print job to general-purpose OS 237 after the print job is completed.

As another example, the predetermined amount or more of data may be log data necessary for determining a cause of an error of image formation apparatus 100 when the error is detected. The log data includes a history of a result of detection done by a sensor used in determining the error, a sequence log indicating a variation in a signal in an image forming sequence in image forming mechanism 120, and the like.

[Access to Mechanism Controller Peripheral Circuit]

Multi-core processor 200 performs a mechanism controller processing by one of the plurality of cores to access mechanism controller peripheral circuit 260. The is because, as has been described above for a conflict in accessing shared memory 240, when a plurality of cores access mechanism controller peripheral circuit 260, their accesses can conflict with each other.

Accordingly, multi-core processor 200 may be configured such that when migrating some mechanism controller processing to a controller core, as has been described above, a mechanism controller processing which does not access mechanism controller peripheral circuit 260 is preferentially migrated. The mechanism controller processing which does not access mechanism controller peripheral circuit 260 includes, for example, a processing to access a cache memory (not shown) provided to each core.

[Prohibiting Access from Controller Processing to Mechanism Controller Peripheral Circuit]

Figure 13:
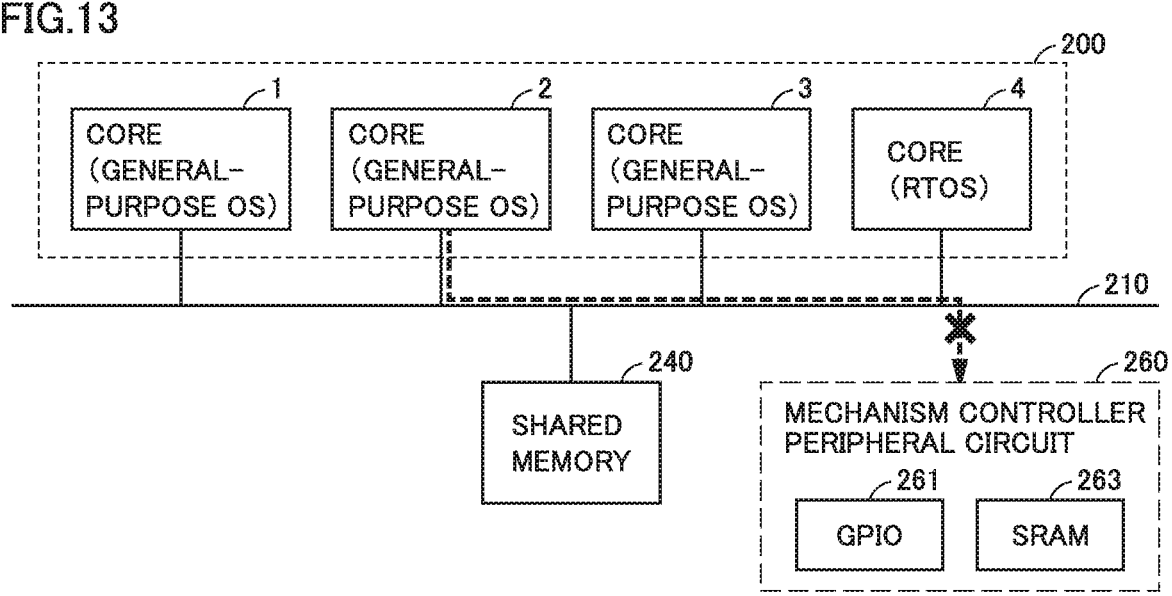
FIG. 13 is a diagram for illustrating a processing for limiting an access of a controller core.

FIG. 13 is a diagram for illustrating a processing for limiting an access of a controller processing. In the example shown in FIG. 13, an access from a controller processing performed in core 2 functioning as a controller core to mechanism controller peripheral circuit 260 is prohibited.

As described above, cores 1 to 4 each run general-purpose OS 237 in the user mode and run RTOS 275 in the privileged mode. A core following the user mode can only access a limited address area. Multi-core processor 200 utilizes this function of the user mode to prohibit access to mechanism controller peripheral circuit 260 from a controller processing performed on a core running general-purpose OS 237. Note that, as described above, there is a case where there is a core which performs both a controller processing and a mechanism controller processing. In such a case, the mechanism controller processing performed by the core can access mechanism controller peripheral circuit 260.

A reason for prohibiting access from a controller processing to mechanism controller peripheral circuit 260 will be described below. Although it is a rare case, on general-purpose OS 237 a problem such as trying to access an address area which does not exist occurs. When such a problem occurs, there is a possibility of accessing mechanism controller peripheral circuit 260 from a controller processing. In such a case, a heater included in fixing device 122 may be turned on or a motor included in motor group 272 may be driven when it is not necessary to do so. Accordingly, multi-core processor 200 according to the embodiment prohibits access from the controller processing to mechanism controller peripheral circuit 260 to prevent the above-described problem.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image formation apparatus comprising:
a multi-core processor having a plurality of cores; and
an image forming mechanism configured to form an image on a recording medium,
at least one core of the plurality of cores including a switching controller configured to switch a first OS run by the core for performing a mechanism controller processing to control the image forming mechanism and a second OS different from the first OS and run by the core for performing a controller processing, wherein each of the first OS and the second OS is independently in communication with the at least one core.

2. The image formation apparatus according to claim 1, wherein the controller processing includes at least one of an image processing, a user interface processing, a network processing, a storage device processing, a facsimile processing, and a mail processing.

3. The image formation apparatus according to claim 1, wherein
the image formation apparatus is configured to switch a plurality of operation modes, and
the multi-core processor is configured to:
in a first operation mode of the plurality of operation modes, perform the mechanism controller processing by a core and the controller processing by a different core; and
in a second operation mode of the plurality of operation modes, perform the mechanism controller processing and the controller processing by a single core.

4. The image formation apparatus according to claim 1, wherein the switching controller is configured to prioritize the mechanism controller processing over the controller processing.

5. The image formation apparatus according to claim 1, wherein
the multi-core processor includes a shared memory accessible by each of the plurality of cores, and
a core which runs the first OS and a core which runs the second OS communicate with each other based on the shared memory.

6. The image formation apparatus according to claim 5, wherein when a core which performs the mechanism controller processing transmits a predetermined amount or more of data to a core which performs the controller processing based on the shared memory, the multi-processor core causes a core which performs the controller processing and includes the switching controller that performs a communication processing in the second OS to perform a communication processing in the first OS.

7. The image formation apparatus according to claim 6, further comprising a sensor configured to detect a state of the image formation apparatus, wherein the predetermined amount or more of data includes a result of detection done by the sensor used for detecting an error of the image formation apparatus.

8. The image formation apparatus according to claim 6, wherein the predetermined amount or more of data includes log data necessary for determining a cause of an error of the image formation apparatus when the error is detected.

9. The image formation apparatus according to claim 1, wherein
the image forming mechanism includes a fixing device configured to fix an image on a recording medium, and
the multi-core processor is configured such that when the multi-core processor is activated while a core which runs the second OS is performing a processing to initialize the second OS a core which runs the first OS performs a mechanism controller processing to control the fixing device.

10. The image formation apparatus according to claim 1, wherein
the image formation apparatus is configured to switch a plurality of operation modes, and
the multi-core processor is configured to determine among the plurality of cores a core which performs the mechanism controller processing and a core which performs the controller processing in accordance with the operation mode.

11. The image formation apparatus according to claim 10, wherein the multi-core processor is configured to:
perform the mechanism controller processing and the controller processing by a smaller number of cores than the plurality of cores in accordance with the operation mode; and
interrupt power supplied to a core among the plurality of cores which does not perform any of the mechanism controller processing and the controller processing.

12. The image formation apparatus according to claim 10, wherein
the operation mode includes a print mode indicating that the image forming mechanism is currently performing a printing processing, and
when the operation mode is the print mode, the multi-core processor determines among the plurality of cores a core which performs the mechanism controller processing and a core which performs the controller processing in accordance with the operation mode such that the cores are different cores.

13. The image formation apparatus according to claim 12, wherein the multi-core processor is configured to perform the mechanism controller processing by a predetermined one of the plurality of cores when the operation mode is the print mode.

14. The image formation apparatus according to claim 12, wherein
the operation mode includes at least one of a scan mode for reading an original document by a document reading device and a FAX mode for transmitting and receiving image information to and from an external device, and
the multi-core processor is configured to perform the mechanism controller processing and the controller processing by a number of cores which is smaller than that of cores used in the print mode when the operation mode is the scan mode or the FAX mode.

15. The image formation apparatus according to claim 10, further comprising a density sensor configured to detect a density of an image formed by the image forming mechanism, wherein
the operation mode includes an image stabilization mode to control an image forming condition in the image forming mechanism based on a result of detection done by the density sensor, and
the multi-core processor is configured to perform the mechanism controller processing by two or more of the plurality of cores when the operation mode is the image stabilization mode.

16. The image formation apparatus according to claim 10, wherein
the operation mode includes a standby mode in which the image forming mechanism is ready for forming an image, and
the multi-core processor is configured to perform the mechanism controller processing and the controller processing by one of the plurality of cores when the operation mode is the standby mode.

17. The image formation apparatus according to claim 10, wherein
the operation mode includes a sleep mode to suppress power consumption of the image formation apparatus, and
the multi-core processor is configured to perform the controller processing by one of the plurality of cores when the operation mode is the sleep mode.

18. The image formation apparatus according to claim 1, further comprising a transporting path configured to transport the recording medium, wherein
the multi-core processor is configured to increase a number of cores among the plurality of cores that perform the mechanism controller processing when a number of recording media on the transporting path is equal to or more than a predetermined number.

19. The image formation apparatus according to claim 1, wherein
the image formation apparatus is configured to allow a sheet feeding device to be attached thereto for supplying a recording medium to the image formation apparatus, and
the multi-core processor sets a number of cores among the plurality of cores that perform the mechanism controller processing to a larger number when the sheet feeding device is attached to the image formation apparatus than when the sheet feeding device is not attached to the image formation apparatus.

20. The image formation apparatus according to claim 1, further comprising a sensor configured to detect a state of the image formation apparatus, wherein the multi-core processor is configured such that when the multi-core processor performs a data analysis processing based on a result of detection done by the sensor the multi-core processor allows one of the plurality of cores to perform the data analysis processing alone.

21. The image formation apparatus according to claim 1, wherein when a core which performs the mechanism controller processing has a load exceeding a predetermined load the multi-core processor causes a core which performs the controller processing and has a smallest load among the at least one core including the switching controller to perform a portion of the mechanism controller processing.

22. The image formation apparatus according to claim 21, wherein the multi-core processor determines the portion of the mechanism controller processing based on at least one of: how many times the processing is activated; and a period of time required for the processing.

23. The image formation apparatus according to claim 1, wherein when the multi-core processor performs the controller processing by two or more of the plurality of cores including first and second cores and the first and second cores have a load less than a predetermined load in total, the multi-core processor performs a controller processing performed by one of the first and second cores having a smaller load by one of the first and second cores having a larger load.

24. The image formation apparatus according to claim 1, further comprising a peripheral circuit used for performing the mechanism controller processing, wherein the multi-core processor is configured to perform a mechanism controller processing by one of the plurality of cores to access the peripheral circuit.

25. The image formation apparatus according to claim 1, further comprising a peripheral circuit used for performing the mechanism controller processing, wherein the multi-core processor is configured to prohibit access to the peripheral circuit from the controller processing performed in the second OS.

26. The image formation apparatus according to claim 1, wherein the second OS performs multiple processings using time-division processing and the first OS does not perform multiple processings using time-division processing.

* * * * *